United States Patent
Tazartes et al.

(10) Patent No.: US 6,298,287 B1
(45) Date of Patent: Oct. 2, 2001

(54) SYSTEM AND METHOD OF COMPENSATING FOR PRESSURE SENSOR ERRORS AND NOISE IN INERTIAL VERTICAL LOOP DATA

(75) Inventors: Daniel A. Tazartes, West Hills; Brian T. Lottman, Moorpark; Dean E. Lottman, Chatsworth; John G. Mark, Pasadena, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/624,457

(22) Filed: Jul. 24, 2000

(51) Int. Cl.[7] ............... B64D 13/04; G05D 1/08
(52) U.S. Cl. ............... 701/4; 701/13; 701/210; 342/355; 342/358; 342/462
(58) Field of Search .......... 701/1, 4, 13, 210, 701/3, 221; 342/355, 358, 38, 385, 462

(56) References Cited

U.S. PATENT DOCUMENTS

| | | | |
|---|---|---|---|
| 3,839,626 | * 10/1974 | Klem et al. | 235/151.3 |
| 4,109,885 | * 8/1978 | Pender | 244/7 R |
| 4,253,335 | * 3/1981 | Shimomura | 73/384 |
| 4,490,794 | * 12/1984 | Griffith et al. | 364/433 |
| 4,553,474 | * 11/1985 | Wong et al. | 98/1.5 |
| 4,882,697 | * 11/1989 | Ross | 364/454 |
| 5,652,592 | * 7/1997 | Sanderford et al. | 342/385 |
| 6,094,607 | * 7/2000 | Diesel | 701/4 |

\* cited by examiner

*Primary Examiner*—Tan Nguyen
*Assistant Examiner*—Dalena Tran
(74) *Attorney, Agent, or Firm*—Price and Gess

(57) ABSTRACT

A system and method for improving the accuracy of altitude determinations in an inertial navigation system. The system utilizes pressure measurements which are taken by a barometric altimeter and converted into an estimated pressure altitude using any known pressure-to-altitude conversion. A pressure correction value is then generated using a correction value generating formula that is a function of altitude. The pressure correction value is then multiplied by a pressure offset value for the barometric altimeter to generate a pressure offset error for the barometric altimeter. This pressure offset error is used in the present invention to modify the pressure altitude estimation in order to generate an altitude determination having an improved accuracy. The present invention further determines an amount of observation noise in the barometric altimeter that is a function of pressure noise and altitude, where the altitude estimation is further modified to account for the observation noise. Thus, the system and method of the present invention improves the accuracy of altitude determinations in inertial navigation system over prior systems by directly accounting for errors in pressure measurements taken by a barometric altimeter due to offset and noise.

32 Claims, 6 Drawing Sheets

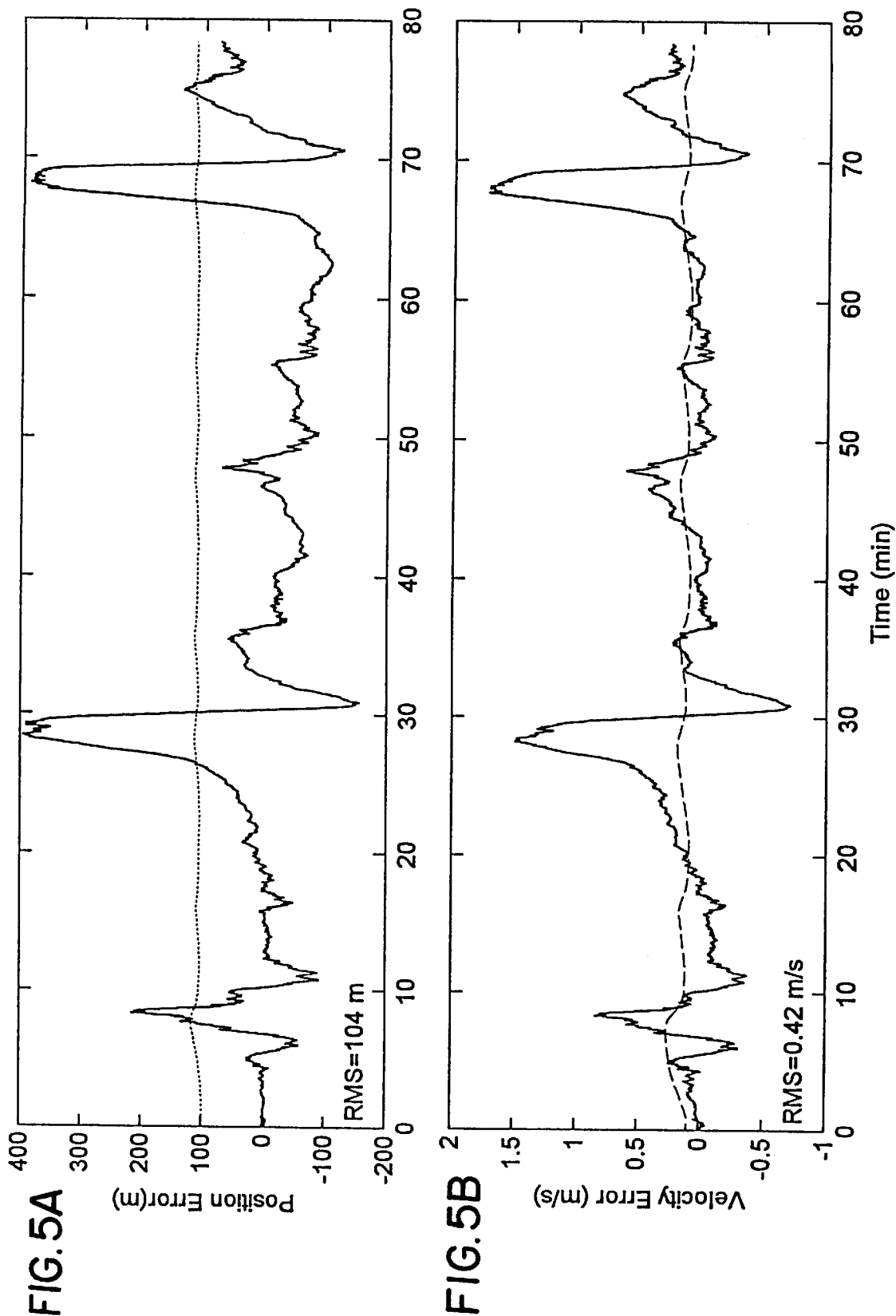

SYSTEM AND METHOD OF COMPENSATING FOR PRESSURE SENSOR ERRORS AND NOISE IN INERTIAL VERTICAL LOOP DATA

BACKGROUND OF THE INVENTION

1. Field of the Invention

The present invention relates generally to inertial navigation systems, and specifically to a system and method for improving the accuracy of pressure altitude determinations in an inertial navigation system.

2. Description of Related Art

Inertial navigation systems in aircrafts have typically employed accelerometers to provide position information to a navigation computer. It is well known that the vertical position (altitude) of the aircraft can be determined from a measured acceleration in the vertical direction by performing a double time integration of the measured vertical acceleration.

The double integration of acceleration in the vertical direction is unstable as acceleration bias can lead to exponential growth in the computed altitude, causing the estimated altitude calculation to have unbounded error due to several factors. First, any vertical acceleration measurement errors from the accelerometers are directly integrated in subsequent calculations to cause both vertical velocity and vertical position error. Second, in order to obtain the actual value for vertical acceleration from the measurement taken by the accelerometer, the effects of gravity must be subtracted from the vertical acceleration measurement. Erroneous acceleration measurements will cause incorrect values for gravity to be subtracted from the measured acceleration, which further compounds the error in the altitude determination causing an even faster growth in the altitude error. Thus, inertial navigation systems relying upon the integration of acceleration measurements to obtain an estimation of altitude are unstable systems.

To provide a more stable inertial navigation system, external references have been used either alone or in combination with inertial measurements to compute estimations of altitude. For instance, a barometric altimeter is a well known device for providing altitude information as a function of the value of barometric pressure based on the direct relationship between pressure and altitude. Barometric altitude, also known as pressure altitude, is determined as a function of pressure based on the standard day model for the atmosphere:

$$S = \begin{cases} K_3 - K_4 \log(P): & P < P_B \\ K_1 \left[ 1 - \left( \frac{P}{P_0} \right)^{K_2} \right]: & P > P_B \end{cases}$$

where S is the pressure altitude, $K_1$=44.342 [km], $K_2$=0.190263 [km], $K_3$=45.395 [km], $K_4$=14.605 [km], $P_0$=1013.25 [mb], and $P_B$=226.32 [mb]. Since the barometric altitude determination is stable, it is typically used in a variety of mechanizations to aid or bound the altitude estimations computed from the inertial measurements in the inertial vertical loop. The independent pressure altitude estimation that aids the inertial vertical loop is referred to as the slave altitude.

Differences between the altitude estimation and true altitude can result from the altitude estimation being based on the standard atmosphere, whereas actual atmospheric conditions encountered by a navigation system are usually nonstandard. Furthermore, errors in the sensors providing the intertial vertical loop data and the pressure data used for the altitude estimation will produce differences between the actual altitude and the estimated altitude. These errors have been modeled in a five state Kalman filter mechanization for the free inertial vertical loop in order to minimize their detrimental effects, as described in the article "A Kalman Filter Mechanization for the Baro-Inertial Vertical Channel" by J. Ausman in *Proceedings of the Institute of Navigation Forty Seventh Annual Meeting*, Williamsburg, Va., pp. 153–159, 1991. The disclosure of this article is hereby incorporated by reference into the present application. This Kalman filter mechanization models five error states including three error states for the inertial vertical loop (inertial vertical acceleration error, inertial vertical velocity error, and inertial vertical position error) and two error states for the pressure altitude (barometric scale factor and barometric bias in the barometer).

The barometric bias and barometric scale factor estimate errors in the pressure altitude determinations made from pressure measurements taken by the barometric altimeter. The barometric bias and scale factor error states essentially attempt to account for differences between the calculated pressure altitude and the calculated intertial altitude, so that the barometric scale factor and the barometric bias are actually modeling errors in altitude. However, the barometric altimeter does not directly measure altitude, rather it directly measures pressure and then mathematically converts the pressure measurement to a value for altitude. Thus, barometric scale factor and barometric bias are actually modeling altitude errors in the barometric altimeter in an artificial domain, since these error states are modeling errors in altitude instead of modeling errors in the actual pressure measurements taken. Noise and pressure offsets in the pressure sensor will result in erroneous pressure measurements which are, in turn, converted into erroneous altitude determinations. The effects of noise and offset on the pressure sensor offset error can deviate substantially at higher altitudes from purely an altitude error, so that merely modeling altitude errors will not always provide an accurate correction of the altitude determination.

Thus, there is clearly a need for a system and method for directly modeling the pressure sensor offset error and noise in the pressure measurements themselves in order to increase the accuracy of altitude determinations in an inertial navigation system.

SUMMARY OF THE INVENTION

The present invention provides a system and method for improving the accuracy of altitude determinations in an inertial navigation system. The system utilizes pressure measurements which are taken by a barometric altimeter and converted into an estimated pressure altitude using any known pressure-to-altitude conversion. A pressure correction value is then generated using a correction value generating formula that is a function of altitude. The pressure correction value is then multiplied by a pressure offset value for the barometric altimeter to generate a pressure offset error for the barometric altimeter. This pressure offset error is then removed from the pressure altitude estimation in order to generate an altitude determination having an improved accuracy. The present invention further determines an amount of observation noise in the barometric altimeter that is a function of pressure noise and altitude, where the altitude estimation is further modified to account for the observation noise. Thus, the system and method of the present invention improves the accuracy of altitude determinations in inertial navigation system over prior systems by directly accounting for errors in pressure measurements taken by a barometric altimeter due to offset and noise.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

FIG. 5A is a graphical illustration of the inertial velocity error for the flight profile of FIGS. 4A–4C with the pressure offset error state of the present invention applied thereto; and FIG. 5B is a graphical illustration of the vertical position error for the flight profile of FIGS. 4A–4C with the pressure offset error state of the present invention applied thereto.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method of improving the accuracy of pressure altitude determinations in an inertial navigation system.

In order to provide an accurate estimation of altitude using external references available to inertial navigation systems in an aircraft, external measurements, such as pressure, temperature and vertical acceleration, are often taken and converted into an estimation of altitude using a physical relationship between the external measurements and altitude. The pressure measurements are taken by a barometric altimeter and converted into an altitude estimation either alone or in combination with other external measurements. In order to account for errors in altitude estimations made from barometric altimeter measurements, past inertial navigation systems have accounted for errors in an artificial domain by estimating errors in the estimated altitude due to barometric scale factor or barometric bias. The present invention models errors directly in the pressure measurements themselves to account for pressure sensor offset and observation noise in the barometric altimeter.

Figure 1:
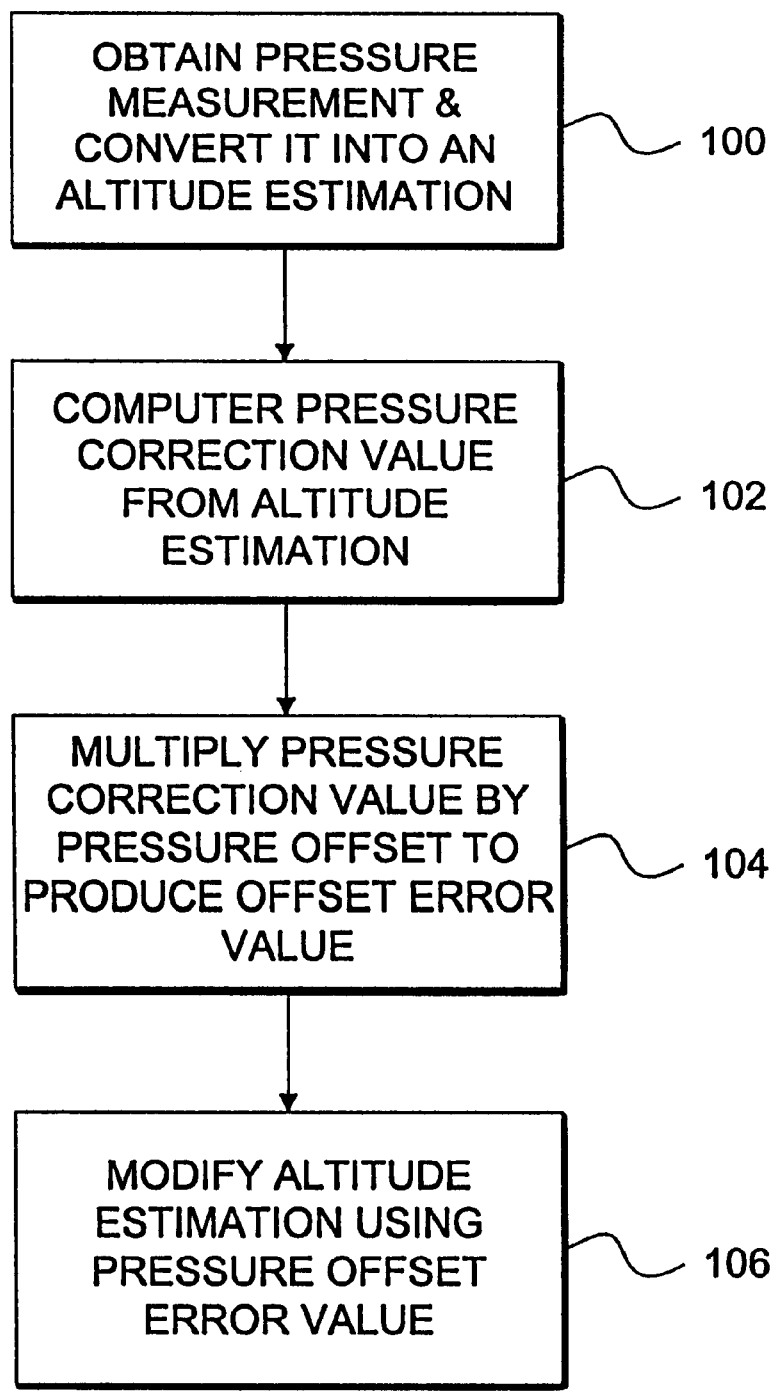
FIG. 1 is an operational block diagram of a preferred method of improving the accuracy of pressure altitude determinations in an inertial navigation system of the present invention.

Referring now to FIG. 1, an operational block diagram of a preferred method of improving the accuracy of pressure altitude determinations in an inertial navigation system of the present invention is illustrated. Initially in step 100, a pressure measurement from the barometric altimeter is obtained, and the pressure measurement is converted into an estimated pressure altitude S using any known relationship between pressure and altitude. The standard day model for the atmosphere is one method commonly used for computing a pressure altitude value from a measured pressure value according to the following equation:

$$S = \begin{cases} K_3 - K_4 \log(P) : & P < P_B \\ K_1 \left[1 - \left(\frac{P}{P_0}\right)^{K_2}\right] : & P > P_B \end{cases}$$

where P is the measured pressure, S is the pressure altitude, $K_1 = 44.342$ [km], $K_2 = 0.190263$, $K_3 = 45.395$ [km], $K_4 = 14.605$ [km], $P_0 = 1013.25$ [mb], and $P_B = 226.32$ [mb]. The standard day model is only one possible manner of converting a measured pressure to an estimated altitude, where it is known to those skilled in the art that altitude can be computed from pressure measurements in a plurality of possible manners, including using a combination of a plurality of external measurements, such as pressure and temperature or other measurable external conditions.

In order to account for errors in the altitude estimation S which may result from erroneous pressure measurements, the present invention determines an amount of pressure offset error in the barometric altimeter and removes this error from the altitude estimation S. A pressure correction value is generated in step 102 by inputting an estimation of altitude into a correction value generating formula f(A) that is a function of altitude A. The correction value generating formula f(A) is the derivative of the standard day pressure altitude and is represented by the equation:

$$f(A) = \frac{dS}{dP} = \begin{cases} -K_5 \left(1 - \frac{A}{K_1}\right)^{\frac{K_2-1}{K_2}} : & A < S_B \\ -\frac{K_4}{\ln(10)} 10^{\frac{A-K_3}{K_4}} : & A > S_B \end{cases}$$

where A is an altitude estimation, $$K_5 = K_2 \frac{K_1}{P_0},$$

and $S_B = 11$ [km]. The estimated altitude A used to compute the pressure correction value is preferably a computed value for the present inertial altitude Z, corrected to have all inertial errors removed therefrom, so that the pressure correction value computed in step 102 is equal to $f(Z_I)$. It is not the intention of the inventors of the present invention to limit the value used for the altitude estimation A to the corrected inertial altitude $Z_I$, where the altitude estimation A may comprise any estimation of altitude, including but not limited to a non-corrected inertial altitude, the pressure altitude S, a Doppler altitude estimation, an altitude estimation produced by a laser altimeter, or a GPS altitude determination.

The pressure correction value $f(Z_I)$ is then multiplied by a value for the pressure offset $P_E$ for the barometric altimeter to generate a pressure offset error value $\Delta S_P$ in step 104 according to the equation:

$$\Delta S_P = P_E \cdot f(Z_I)$$

The pressure offset error value $\Delta S_P$ is then removed from the altitude estimation S in step 106 to generate an altitude determination having an improved accuracy by directly accounting for the pressure offset error in the barometric altimeter.

Figure 2:
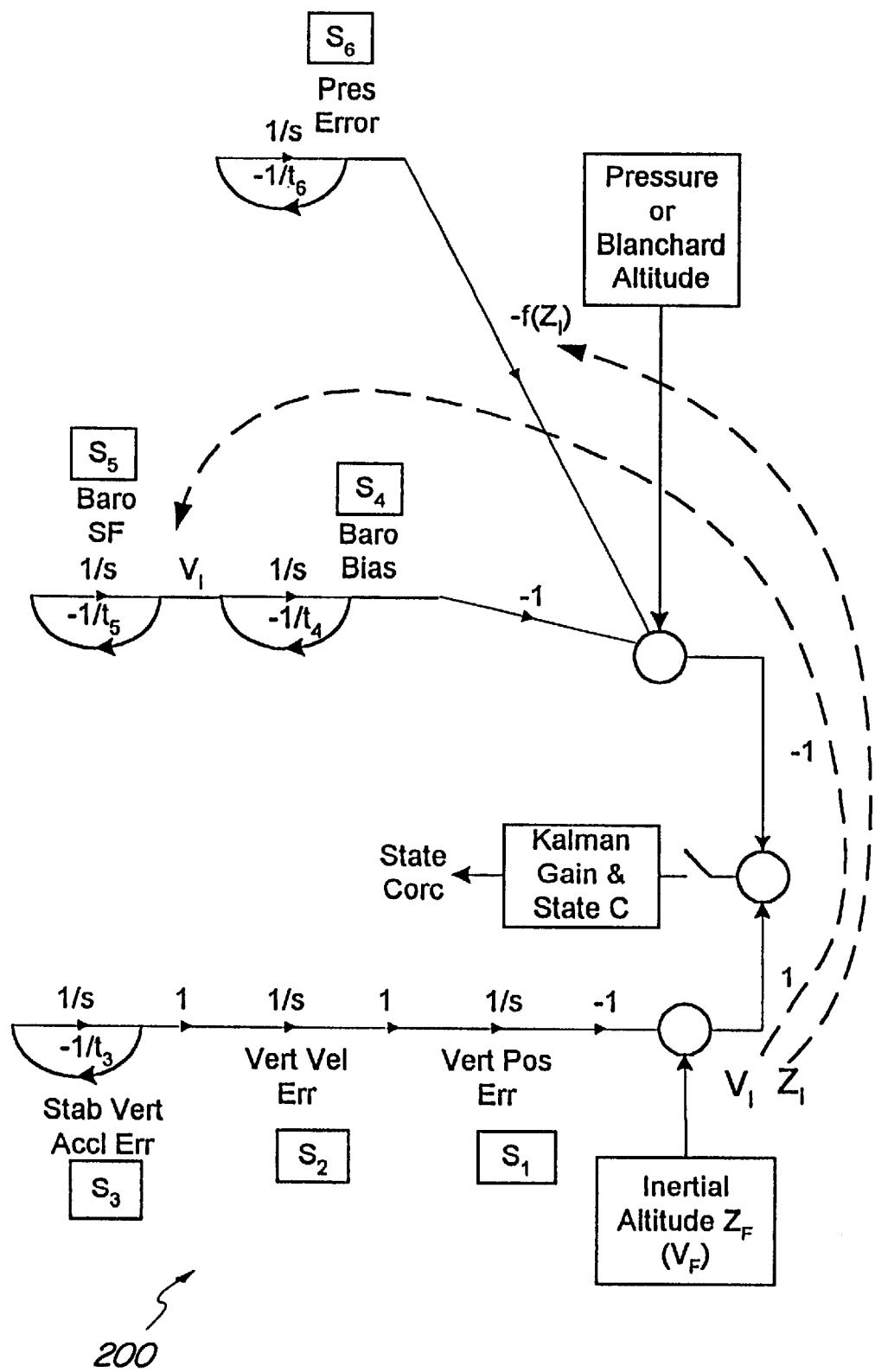
FIG. 2 is a state diagram of six state Kalman filter mechanization of a referred embodiment of the present invention.

In order to account for the various errors associated with generating an altitude determination, these errors can be modeled in a state diagram mechanization. Referring now to FIG. 2, a state diagram of six state Kalman filter mechanization of a preferred embodiment of the present invention is illustrated. The mechanization includes three inertial error states: a stabilized vertical acceleration bias error state $S_3$, which feeds a vertical velocity error state $S_2$, which feeds a vertical position error state $S_1$. The inertial error states are used to correct a inertial altitude $Z_F$ calculated from a measured vertical acceleration as commonly known to those skilled in the art in order to produce the corrected inertial altitude $Z_I$. Vertical acceleration bias can be difficult to model, since changes in attitude can result in other accelerometers tipping into the vertical channel. In order to avoid accelerometer bias modeling in all three axes, accelerometer switching can be accounted for by injecting a covariance into the single channel dependent on platform attitude.

The Kalman filter mechanization of FIG. 2 further contains three error states accounting for the barometric altimeter (or barometer):) a pressure offset error state $S_6$, a barometer scale factor error state $S_5$, and a barometer bias error state $S_4$, wherein the barometer scale factor error state $S_5$ feeds the barometer bias error state $S_4$. The observation element for the barometer scale factor error state $S_5$ is driven by an estimate for inertial velocity $V_I$, while the observation element for the pressure offset error state $S_6$ is the corrected inertial altitude $Z_I$ (as indicated by the dashed lines in FIG. 2). The Kalman filter utilizes these six errors states to determine the Kalman gain and state correction value in determining portion 200, where this correction value is then used to modify the altitude estimation to output a more accurate determination of altitude. The Kalman filter is implemented in software being run by the navigation system, and the Kalman filter receives inputs from sensors connected to the navigation system.

A barometric altimeter with a pressure offset produces an altitude error that grows with altitude. Using the equation for the standard day pressure altitude, for a pressure offset $P_E$, the altitude error can be represented by the equation:

$$\Delta S_R = \begin{cases} K_1 K_6 - K_1 \left( K_6^{\frac{1}{K_2}} + \frac{P_E}{P_0} \right)^{K_2} & : A < S_B \\ K_4 \log \left( \dfrac{K_6^{\frac{1}{K_2}}}{K_6^{\frac{1}{K_2}} + \frac{P_E}{P_0}} \right) & : A > S_B \end{cases}$$

where $$K_6 = 1 - \frac{A}{K_1},$$

$K_1$=44.342, $K_2$=0.190263, $K_4$=14.605, $P_o$=1013.25 [mb], $S_B$=11 [km], and A is the altitude estimation. The present invention allows any estimation of altitude to be utilize for altitude estimation A. The pressure offset $P_E$ may have a predetermined value or may be determined by calibration techniques or other similar techniques commonly known to those skilled in the art.

At higher altitudes as well as for large pressure offsets $P_E$, the correction value generating formula f(A) is not linear and the altitude error $\Delta S_R$ can differ greatly from the pressure offset error $\Delta S_P$. For a typical value of the pressure offset $P_E$ approximately equal to 0.125 [mb] at a true altitude A=30 km, $\Delta S_R/\Delta S_P$~4.1. The correction value generating formula f(A) produces a better estimate for the pressure offset error $\Delta S_P$ when the altitude A is assumed to be less than $S_B$. For $A < S_B$, $\Delta S_R/\Delta S_P$~2.3 for typical values used in the equations. While a mismatch in the observation element which is a function of altitude may exist, the Kalman filter mechanization of FIG. 2 will converge to the appropriate pressure offset $P_E$ to remove the pressure offset error $\Delta S_P$.

The pressure sensor in the barometric altimeter also has a pressure noise associated with it that the present invention models as an observation noise. For pressure sensor noise with a given standard deviation $\sigma_P$, the effects of this pressure sensor noise on the altitude determination are more pronounced at higher altitudes. As an aircraft increases its altitude, a given change in pressure will result in a larger change in altitude. Thus, the error associated with the pressure sensor noise increases with altitude. The present invention accounts for this altitude dependent error by estimating the amount of pressure noise and converting it into an altitude noise that is a function of both altitude and pressure noise.

Figure 3:
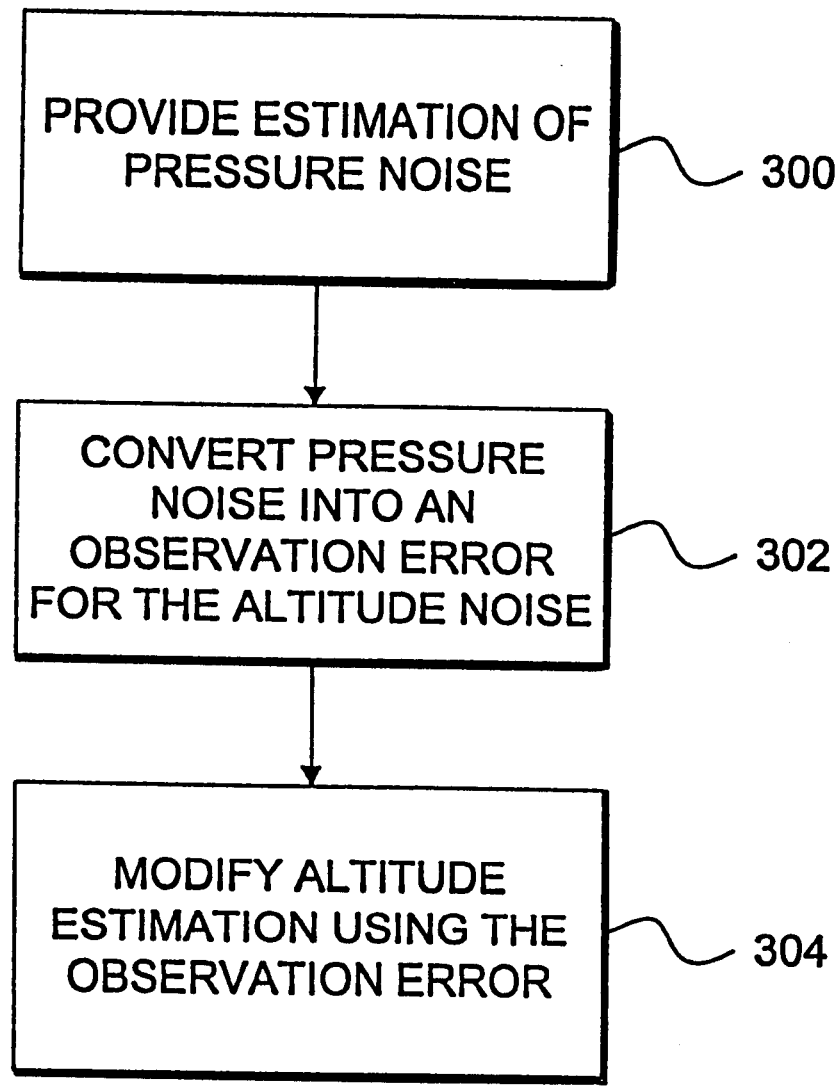
FIG. 3 is an operational block diagram of a preferred method of modeling the observation noise in accordance with the present invention.

Referring now to FIG. 3, an operational block diagram of a preferred method of modeling the observation noise in accordance with the present invention is illustrated. Initially in step 300, a standard deviation of the pressure noise $\sigma_P$ is estimated for the barometric altimeter as known to those skilled in the art. The standard deviation $\sigma_P$ of the pressure noise is then converted into a standard deviation $\sigma_E$ for the observation error for the altitude noise in step 302. The standard deviation $\sigma_E$ of the observation error is determined by substituting $\sigma_P = P_E$ and $\sigma_E = \Delta S_R$ into the altitude error equation, so that:

$$\sigma_E = \begin{cases} K_1 K_6 - K_1 \left( K_6^{\frac{1}{K_2}} + \frac{\sigma_P}{P_0} \right)^{K_2} & : A < S_B \\ K_4 \log \left( \dfrac{K_6^{\frac{1}{K_2}}}{K_6^{\frac{1}{K_2}} + \frac{\sigma_P}{P_0}} \right) & : A > S_B \end{cases}, \text{ where } K_6 = 1 - \frac{A}{K_1}$$

where $K_1$=44.342, $K_2$=0.190263, $K_4$=14.605, $P_o$=1013.25 [mb], $S_B$=11 [km], and A is the altitude estimation. The observation error is thus a function of both pressure noise $\sigma_P$ and altitude A, which enables the altitude noise to be more closely approximated than previously achievable. At high altitudes, small pressure errors will lead to large pressure altitude errors. Finally in step 304, the observation error is utilized to modify the altitude estimation to account for the altitude noise. The system and method of the present invention models noisy barometric altimeters through the use of an additional pressure offset state and an observation noise that is a function of pressure noise and altitude. The ability to compensate for sensor errors and bound the vertical channel is dependent on the accuracy of the Kalman filter model. The additional information which the present invention utilizes in the Kalman filter model will improve the estimates for noisy pressure sensors, especially at high altitudes.

Figure 4A:
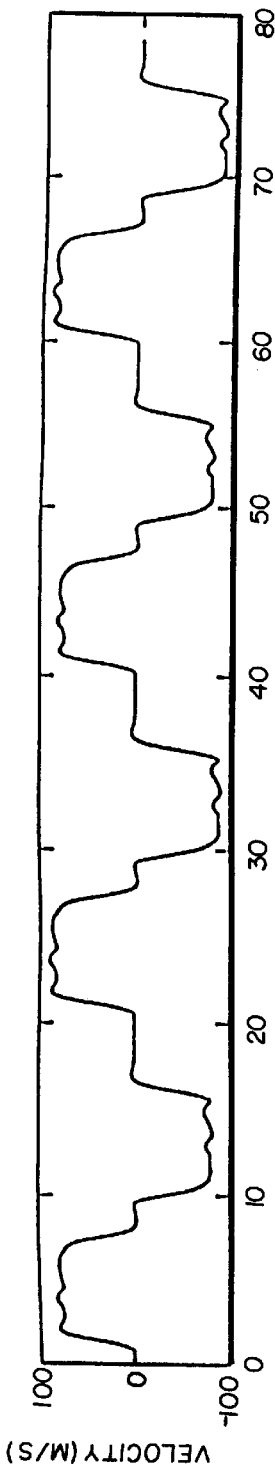
FIGS. 4A–4C are graphical illustrations of an example of the flight profile of an X-33 aircraft.
Figure 4B:
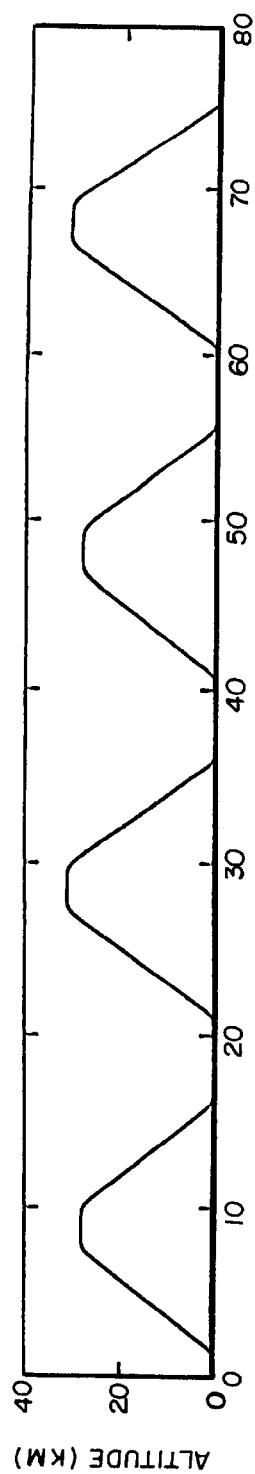
Figure 4C:
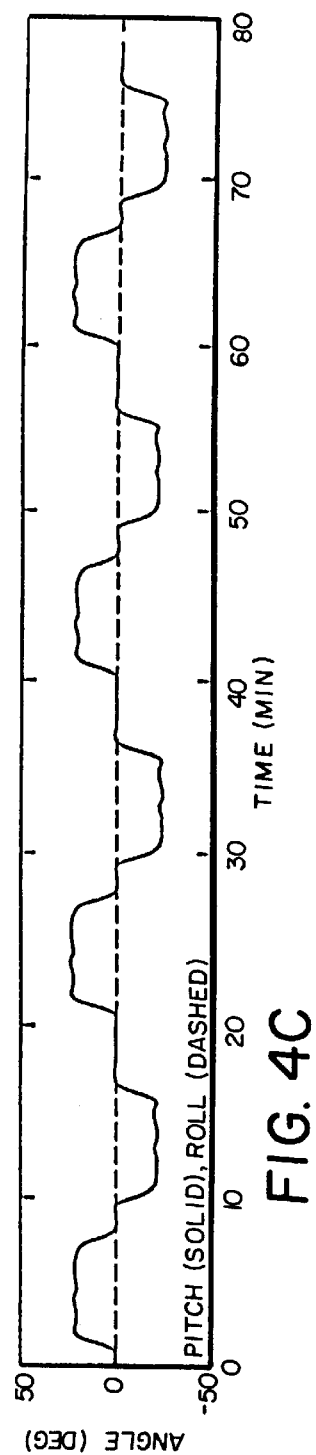
Figure 4D:
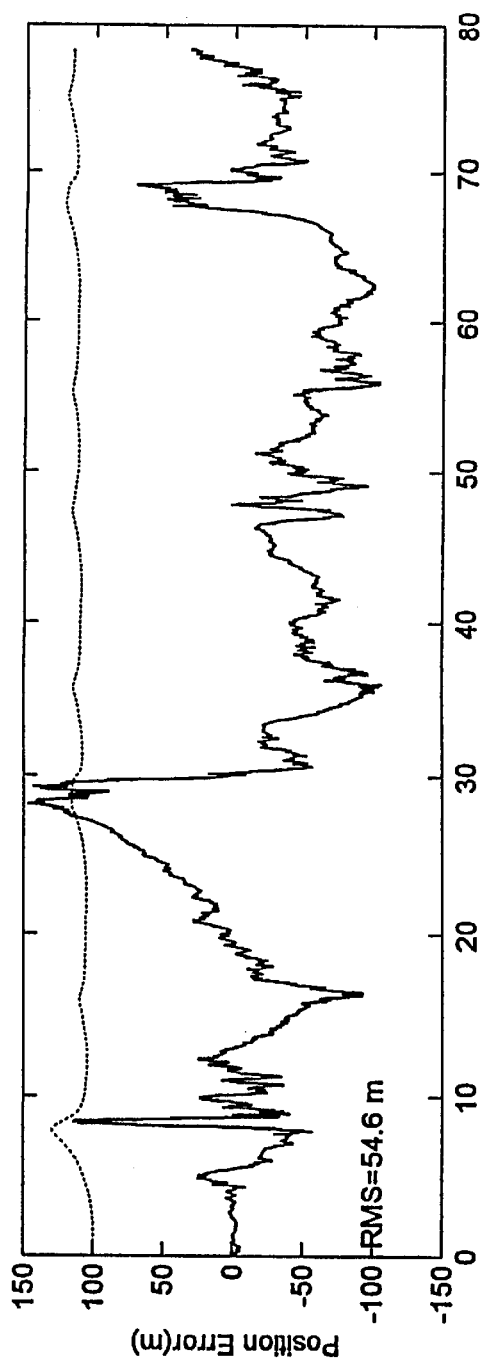
FIG. 4D is a graphical illustration of the inertial velocity error for the flight profile of FIGS. 4A–4C.
Figure 4E:
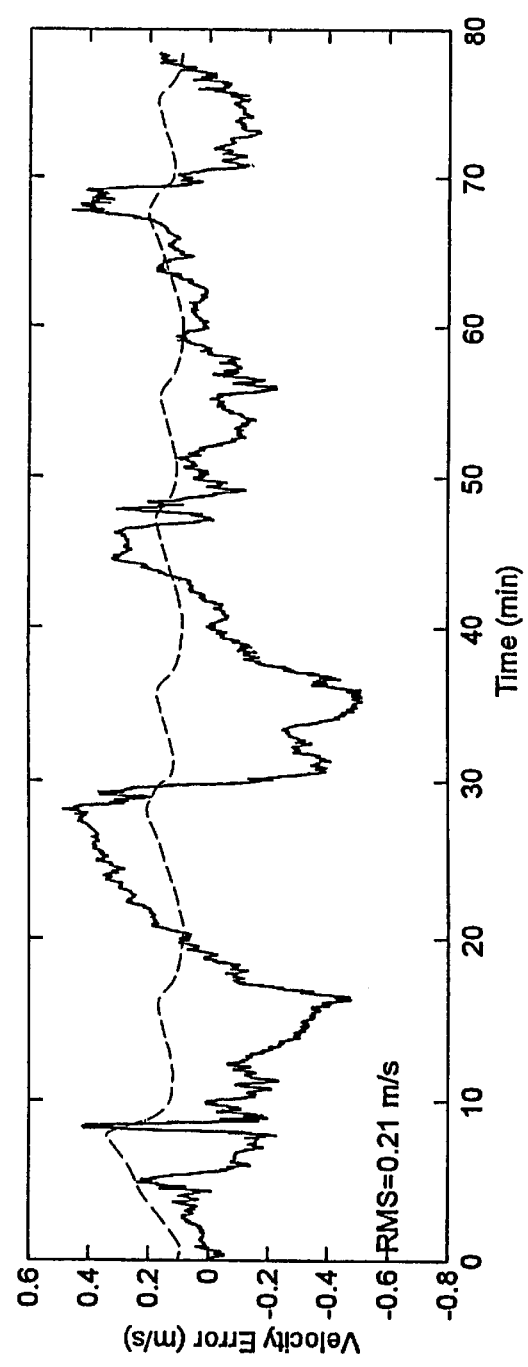
FIG. 4E is a graphical illustration of the vertical position error for the flight profile of FIGS. 4A–4C.

Simulations performed by the inventors of the present invention suggest that for typical scale factor, barometer offset, pressure offset, and pressure noise values, velocity errors for a variety of flights up to 100,000 feet are better than 0.2 m/s RMS. An example of an X-33 profile with multiple climbs and dives is shown in FIGS. 4A–4C. FIG. 4A illustrates the aircraft velocity, FIG. 4B illustrates the aircraft altitude, and FIG. 4C illustrates the platform attitude. The inertial velocity error for this profile is shown in FIG. 4D, while the vertical position error is shown in FIG. 4E. Dashed lines 400 and 402 in FIGS. 4D and 4E, respectively, illustrate the square root of the covariance for the given state. The same profile illustrated in FIGS. 4A–4C was simulated without a pressure offset error state, where the inertial velocity error and vertical position error were found to be significantly degraded, as illustrated in FIGS. 5A and 5B, respectively. On average, the pressure offset state for typical atmospheric conditions and high altitude scenarios improved the inertial velocity error 2/1.

The system and method of the present invention improves the accuracy of altitude determinations made using pressure measurements taken by a barometric altimeter by directly modeling a pressure offset error and by modeling an observation noise that is a function of pressure noise and altitude. As can be seen from the foregoing, a system and method for improving the accuracy of altitude determinations in an inertial navigation system formed in accordance with the present invention is provided by directly accounting for errors in measurements taken by the barometric altimeter itself in the form of pressure offset error and observation noise.

In each of the above embodiments, the different structures of the system for improving the accuracy of altitude measurements in an inertial navigation system of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. For instance, the teachings of the present invention are not intended to be limited to inertial navigation systems, where the teachings of the present invention can be extended to other applications which utilize pressure measurements to generate an altitude determination. Therefore, it is to be understood that, within the scope of the appended claims, the invention may be practiced other than as specifically described herein.

What is claimed is:

1. A method of improving the accuracy of altitude determinations made using pressure measurements taken by a barometric altimeter, comprising the steps of:

obtaining a pressure measurement and generating an altitude estimation using the pressure measurement;

computing a pressure correction value using a correction value generating formula that is a function of altitude;

computing a pressure offset error value by multiplying the pressure correction value by a pressure offset value for the barometric altimeter; and modifying the altitude estimation using the computed pressure offset error value to generate an improved altitude determination.

2. The method of claim 1, wherein the correction value generating formula is the derivative of the standard day pressure altitude and is represented by the following equation:

$$f(A) = \begin{cases} -K_5\left(1 - \dfrac{A}{K_1}\right)^{\frac{K_2-1}{K_2}} & : A < S_B \\ -\dfrac{K_4}{\ln(10)} 10^{\frac{A-K_3}{K_4}} & : A > S_B \end{cases}, \text{ where } K_5 = K_2 \dfrac{K_1}{P_0}$$

where $K_1=44.342$, $K_2=0.190263$, $K_3=45.395$, $K_4=14.605$, $S_B=11$ [km], A is a value for altitude.

3. The method of claim 1, wherein a filter performs the step of modifying the altitude estimation using the pressure offset error value.

4. The method of claim 3, wherein the filter is a multiple-state Kalman filter.

5. The method of claim 4, wherein the Kalman filter models a pressure offset error state.

6. The method of claim 5, wherein the Kalman filter further models barometric bias and scale factor error states as well as modeling inertial altitude error states.

7. The method of claim 1, further comprising the step of modifying the altitude estimation by accounting for pressure sensor noise in the barometric altimeter.

8. The method of claim 7, wherein the pressure sensor noise, $\sigma_E$, is determined according to the equation:

$$\sigma_E = \begin{cases} K_1 K_6 - K_1\left(K_6^{\frac{1}{K_2}} + \dfrac{\sigma_p}{P_0}\right)^{K_2} & : A < S_B \\ K_4 \log\left(\dfrac{K_6^{\frac{1}{K_2}}}{K_6^{\frac{1}{K_2}} + \dfrac{\sigma_p}{P_0}}\right) & : A > S_B \end{cases}, \text{ where } K_6 = 1 - \dfrac{A}{K_1}$$

where $K_1=44.342$, $K_2=0.190263$, $K_4=14.605$, $P_o=1013.25$ [mb], $S_B=11$ [km], $\sigma_p$ is the standard deviation of the pressure noise, and A is a value for altitude.

9. The method of claim 8, wherein a filter performs the step of modifying the altitude estimation by accounting for the pressure sensor noise.

10. The method of claim 2, wherein the value for altitude A used to compute the pressure correction value is different from the generated altitude estimation.

11. The method of claim 10, wherein a computed inertial altitude is used as the value for altitude A.

12. A system for improving the accuracy of altitude determinations made using pressure measurements taken by a barometric altimeter, comprising:

a pressure altitude generator which generates a received pressure measurement from the barometric altimeter pressure sensor into an altitude estimation;

a pressure sensor correction value generator which generates a pressure correction value using a correction value generating formula that is a function of altitude;

an error value generator which computes a pressure offset error value by multiplying the pressure correction value by a pressure offset value; and an altitude determination unit which modifies the altitude estimation using the computer pressure offset error value to provide an improved altitude determination.

13. The system of claim 12, wherein the correction value generating formula is the derivative of the standard day pressure altitude and is represented by the following equation:

$$f(A) = \begin{cases} -K_5\left(1 - \dfrac{A}{K_1}\right)^{\frac{K_2-1}{K_2}} & : A < S_B \\ -\dfrac{K_4}{\ln(10)} 10^{\frac{A-K_3}{K_4}} & : A > S_B \end{cases} \quad \text{where } K_5 = K_2 \dfrac{K_1}{P_0}$$

where $K_1=44.342$, $K_2=0.190263$, $K_3=45.395$, $K_4=14.605$, $S_B=11$ [km], A is a value for altitude.

14. The system of claim 12, wherein the altitude determination unit which modifies the altitude estimation using the computer pressure offset error value to provide an improved altitude determination is included in a filter.

15. The system of claim 13, wherein the filter is a multiple-state Kalman filter.

16. The system of claim 15, wherein the Kalman filter models a pressure offset error state.

17. The system of claim 16, wherein the Kalman filter further models barometric bias and scale factor error states as well as modeling inertial altitude error states.

18. The system of claim 12, further comprising a noise compensator for modifying the altitude estimation by accounting for a pressure sensor noise in the barometric altimeter.

19. The system of claim 18, wherein the pressure sensor noise, $\sigma_E$, is determined according to the equation:

$$\sigma_E = \begin{cases} K_1 K_6 - K_1\left(K_6^{\frac{1}{K_2}} + \dfrac{\sigma_p}{P_0}\right)^{K_2} & : A < S_B \\ K_4 \log\left(\dfrac{K_6^{\frac{1}{K_2}}}{K_6^{\frac{1}{K_2}} - \dfrac{\sigma_p}{P_0}}\right) & : A > S_B \end{cases}, \text{ where } K_6 = 1 - \dfrac{A}{K_1}$$

where $K_1=44.342$, $K_2=0.190263$, $K_4=14.605$, $P_o=1013.25$ [mb], $S_B=11$ [km], $\sigma_p$ is the standard deviation of the pressure noise, and A is a value for altitude.

20. The system of claim 19, wherein the noise compensator is included within a filter.

21. The system of claim 13, wherein the value for altitude A used to compute the pressure correction value is different from the generated altitude estimation.

22. The system of claim 21, wherein a computed inertial altitude is used as the value for altitude A.

23. A system for improving the accuracy of altitude determinations made using pressure measurements taken by a barometric sensor, comprising:
    a multiple-state Kalman filter which models at least one error state;
    a first altitude estimation input fed into said Kalman filter indicating an estimation of altitude;
    a pressure altitude estimation input fed into said Kalman filter indicating an estimated pressure altitude computed from a pressure measurement taken by the barometric sensor; and
    a pressure offset error input fed into said Kalman filter, said pressure offset error being driven by said first altitude estimation and being modeled into a corresponding pressure error state by said Kalman filter;
    wherein said Kalman filter generates an altitude determination by modifying said pressure altitude estimation using said pressure offset error state.

24. The system of claim 23, wherein said first altitude estimation is a value for inertial altitude.

25. The system of claim 24, further comprising:
    at least one inertial altitude error input fed into said Kalman filter, said at least one inertial altitude error being modeled into a corresponding error state by said Kalman filter; and
    at least one barometric sensor error input fed into said Kalman filter, said at least one barometric sensor error being modeled into a corresponding error state by said Kalman filter.

26. The system of claim 25, wherein said at least one inertial altitude error includes an inertial vertical acceleration error, an inertial vertical velocity error, and an inertial vertical position error.

27. The system of claim 25, wherein said at least one barometric sensor error input includes a barometric bias error and a barometric scale factor error.

28. The system of claim 23, wherein said Kalman filter further estimates the amount of pressure sensor noise in the barometric sensor and accounts for this pressure noise when generating the altitude determination.

29. The system of claim 28, wherein the pressure sensor noise, $\sigma_E$, is determined according to the equation:

$$\sigma_E = \begin{cases} K_1 K_6 - K_1\left(K_6^{\frac{1}{K_2}} + \dfrac{\sigma_p}{P_0}\right)^{K_2} & : A < S_B \\ K_4 \log\left(\dfrac{K_6^{\frac{1}{K_2}}}{K_6^{\frac{1}{K_2}} - \dfrac{\sigma_p}{P_0}}\right) & : A > S_B \end{cases}, \text{ where } K_6 = 1 - \dfrac{A}{K_1}$$

where $K_1=44.342$, $K_2=0.190263$, $K_4=14.605$, $P_o=1013.25$ [mb], $S_B=11$ [km], $\sigma_p$ is the standard deviation of the pressure noise, and A is a value for altitude.

30. The system of claim 23, wherein said pressure offset error is computed by multiplying a pressure offset value for the barometric sensor by a pressure correction value, said pressure correction value being calculated from the following equation:

$$f(A) = \begin{cases} -K_5\left(1 - \dfrac{A}{K_1}\right)^{\frac{K_2-1}{K_2}} & : A < S_B \\ -\dfrac{K_4}{\ln(10)} 10^{\frac{A-K_3}{K_4}} & : A > S_B \end{cases} \quad \text{where } K_5 = K_2 \dfrac{K_1}{P_0}$$

where $K_1=44.342$, $K_2=0.190263$, $K_3=45.395$, $K_4=14.605$, $S_B=11$ [km], and A is a value for altitude.

31. The system of claim 30, wherein the value for altitude A used to compute the pressure correction value is the computed inertial altitude.

32. The system of claim 30, wherein the value for altitude A used to compute the pressure correction value is the pressure altitude estimation.

* * * * *